United States Patent [19]

Uehara

[11] Patent Number: 5,131,524
[45] Date of Patent: Jul. 21, 1992

[54] CONVEYOR SYSTEM WITH MOVABLE PARTITIONS

[76] Inventor: Akira Uehara, 1-19-18 Nishi-Tsutsujigaoka, Chofu-shi, Tokyo, 182, Japan

[21] Appl. No.: 696,027

[22] Filed: May 6, 1991

[30] Foreign Application Priority Data

May 9, 1990 [JP] Japan .................................. 2-48507
Oct. 5, 1990 [JP] Japan ................................. 2-105435

[51] Int. Cl.⁵ ............................................. B65G 19/26
[52] U.S. Cl. ................................. 198/732; 198/525; 198/550.12; 198/725
[58] Field of Search ........... 198/525, 531, 540, 550.12, 198/716, 728, 732, 725

[56] References Cited

U.S. PATENT DOCUMENTS

| | | | |
|---|---|---|---|
| 731,754 | 6/1903 | Clarke | 198/732 X |
| 2,264,674 | 12/1941 | Murray | 198/732 |
| 2,692,067 | 10/1954 | Hapman | 198/716 X |
| 2,941,679 | 6/1960 | Miller | 198/732 X |
| 3,241,653 | 3/1966 | van Huis | 198/525 X |
| 4,163,490 | 8/1979 | Timm | 198/531 |

Primary Examiner—Joseph E. Valenza
Assistant Examiner—Tuan N. Nguyen
Attorney, Agent, or Firm—Sandler, Greenblum & Bernstein

[57] ABSTRACT

Disclosed is a conveyor system with movable partitions, which is so designed that powdery goods, grainy goods or other shapeless goods, or loose stuff, such as molded resin articles, can surely and safely be conveyed, when excessive resistance is applied to the lower end portion of a partition moving within a load-receiving tray, the partition swings rearward to run free of the load, when goods to be conveyed get stuck at the lower end portion of the partition, the partition moves in that state in the tray dragging the goods along, and when the partition reaches the front sprocket in the running direction and the partition-attached portion of an endless caterpillar engages with the sprocket and rotates about a quarter, the partition is flipped over, permitting the goods to be set free or removed.

15 Claims, 10 Drawing Sheets

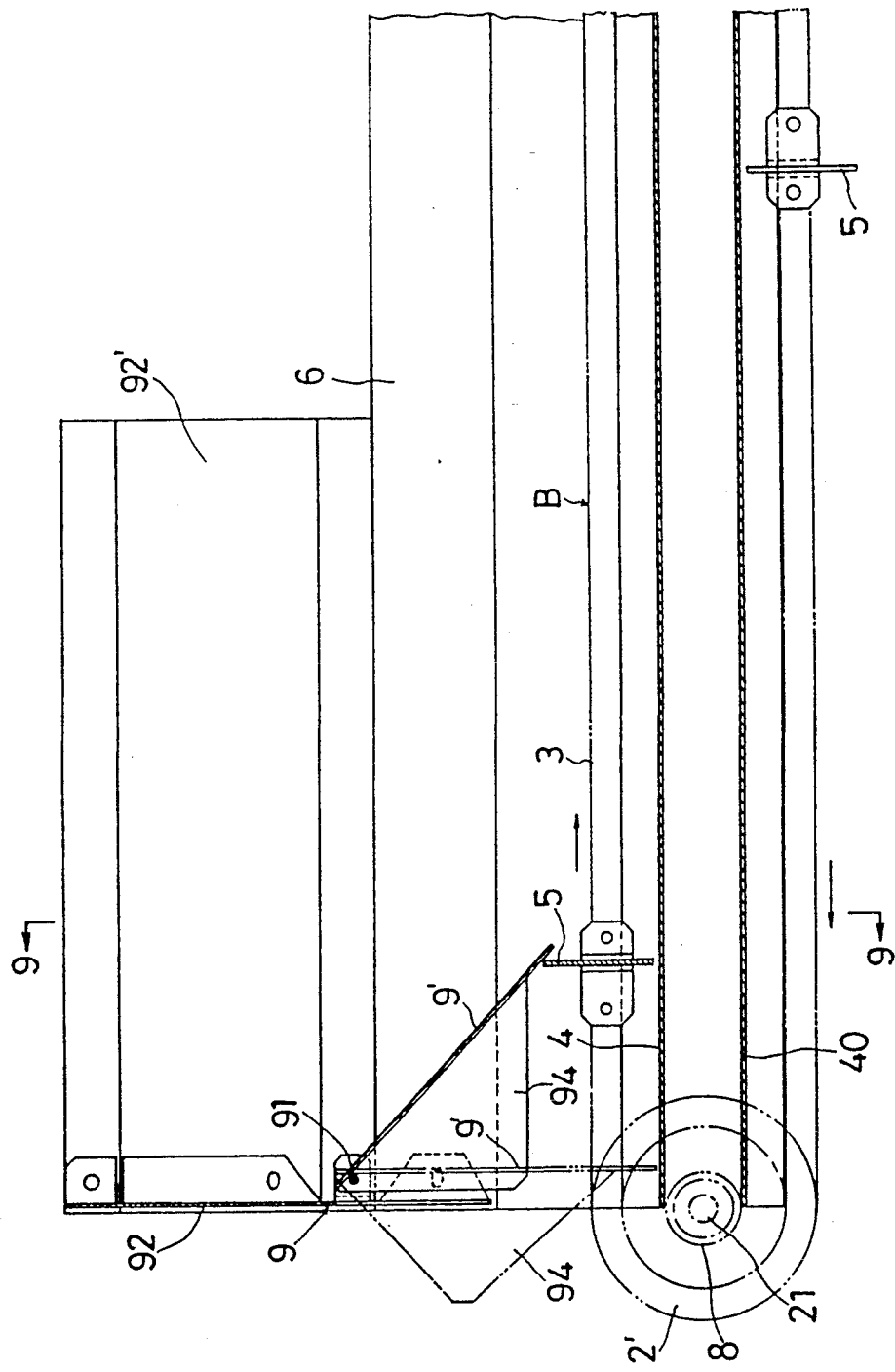

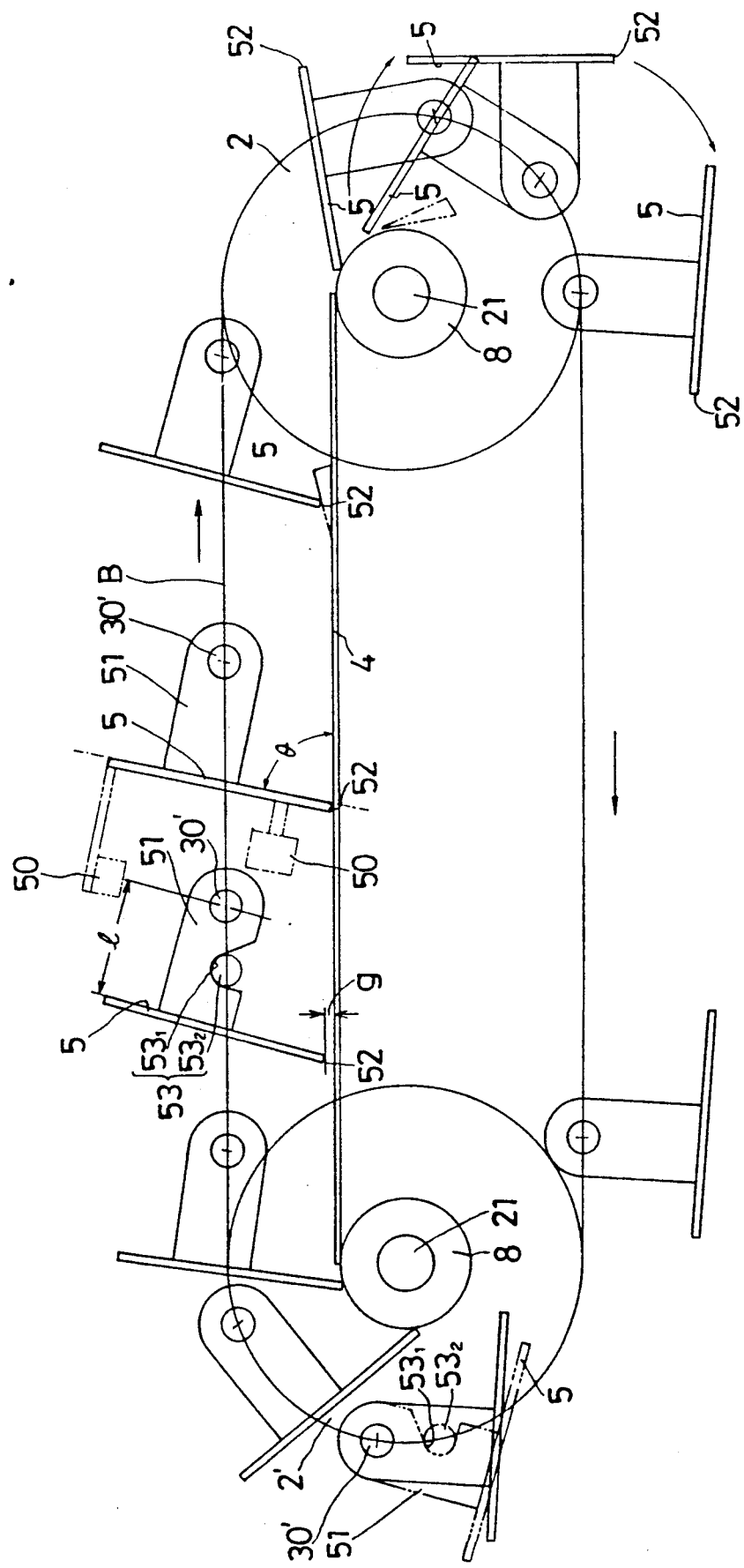

CONVEYOR SYSTEM WITH MOVABLE PARTITIONS

BACKGROUND OF THE INVENTION

1. Field of the Invention

The present invention relates to a conveyor system with movable partitions More particularly, this invention pertains to a conveyor system with movable partitions, which is so designed that powdery goods, grainy goods or other shapeless goods, or loose stuff, such as molded resin articles, can surely and safely be conveyed, when excessive resistance is applied to the lower end portion of a partition in motion, the partition swings rearward to run free of the load, when goods to be conveyed get stuck at the lower end portion of the partition, the partition moves in that state in a load-receiving tray and is flipped over at the front sprocket portion in the running direction to set the goods free, and a guide mechanism is provided to prevent goods to be conveyed from being scattered over the chain belt portion or from contacting the sprocket shaft, staining it, at the time the goods are to be moved off or unloaded for the next process.

2. Description of the Related Art

There are conventional conveyor systems which have partition members provided at the conveyor belt portion to convey a constant amount of goods.

According to the prior art technology, the partitions also serving to push or urge goods to be conveyed are generally attached integral with the conveyor belt, so that the partitions can move as the belt runs. Since the stuff-loading surface of the belt is approximately flat and is open to both sides, however, a large amount of powdery goods or shapeless stuff, when placed on the belt, are likely to fall off from the sides thereof. In this respect, the conventional conveyor systems are inadequate for conveying such stuff. If fall-preventing plates are provided at both sides of the belt, they can prevent the mentioned goods from falling off from either side. Precision is demanded to permit the partitions to move while contacting the stuff-loading surface and the fall-preventing plates without seams, which is difficult to realize. Actually, the partitions move with slight gaps with respect to the stuff-loading surface and fall-preventing plates.

When goods to be conveyed are loose goods, such as small molded articles which are to be taken many at a time, or when runner waste produced between the sprue to the gate at the time of processing articles are to be conveyed, such stuff often gets stuck between the partitions and the load-receiving tray, damaging the partitions or causing the driving mechanism to malfunction.

SUMMARY OF THE INVENTION

It is therefore an object of the present invention to provide a conveyor system which is designed to overcome the above conventional problems and can thus prevent goods to be conveyed, such as powdery goods or shapeless goods, even when loaded directly on the endless caterpillar, from falling off the stuff-loading surface or from either side of the endless caterpillar in the width direction thereof, can surely and safely convey the goods on the stuff-loading surface with the movement of partitions that form partitioned space, and can drag goods along that get caught or stuck in any partition and then flip the partition over at the front sprocket portion in the running direction to set the goods free.

The first feature of the present invention lies in that in a conveyor system with movable partitions, guide rails for receiving chain belts are each provided between a pair of front and rear sprockets, each chain belt is put around the front and rear sprockets to thereby form an endless caterpillar, the guide rails are held apart sideward from each other at a predetermined interval and are secured by means of main bars, a load-receiving tray having a recessed groove shape is provided between the right and left endless caterpillars, and multiple partitions movable in the load-receiving tray are attached approximately equidistant to the right and left endless caterpillars.

The second feature of the present invention lies in that the conveyor system with movable partitions as described above includes, brackets being provided at right and left ends of each partition in such a way that front portions of the brackets which are located apart by a predetermined distance from the associated partition in a running direction are coupled rotatably to the respective endless caterpillars by shafts, whereby the partitions are flipped over by means of the endless caterpillars where the front portions of the brackets are coupled thereto, in accordance with rotation of the front sprockets in the running direction, so that lower end portions of the partitions are greatly supports from an inner bottom of the load-receiving tray and are hung from the endless caterpillars in return motion.

The third feature of the present invention lies in that in the conveyor system with movable partitions as described above, an adjusting member for adjusting a gap between lower edges of the partitions and an inner bottom of the load-receiving tray is provided on the brackets.

The fourth feature of the present invention lies in that in the conveyor system with movable partitions as described above a cone member is provided at a lower portion or an upper portion of each of the partitions.

The fifth feature of the present invention lies in that in the conveyor system with movable partitions as described above the that a portion of each of the guide rails which is located on an upper conveying side of the associated endless caterpillar has a recessed passage formed therein for supporting top and bottom surfaces of the associated chain belt.

The sixth feature of the present invention lies in that in the conveyor system with movable partitions as described above a gap-sealing member is provided to seal a gap between at least the front sprocket and the load-receiving tray.

The seventh feature of the present invention lies in that in the conveyor system with movable partitions as described above a recessed groove is formed in an outer side of each of the guide rails and a sprocket-shaft receiving member is attached in the recessed groove.

The eighth feature of the present invention lies in that in the conveyor system with movable partitions as described above a pipe for preventing goods to be conveyed from contacting sprocket shafts is supported by front sprocket shafts between at least the front right and left sprockets.

The ninth feature of the present invention lies in that in the conveyor system with movable partitions as described above a side cover is provided at an upper portion of an upright wing member of the load-receiving tray.

The tenth feature of the present invention lies in that in the conveyor system with movable partitions as described above a fall-off preventing plate is provided to the load-receiving tray and a rear portion of a side cover in such a manner as to be rotatable in a running direction of the endless caterpillar.

The eleventh feature of the present invention lies in that in the conveyor system with movable partitions as described above a hopper wall plate is attached to a rear end portion of the load-receiving tray, a downward opening matching an inner surface of the load-receiving tray in a width direction thereof is formed in a center portion of the hopper wall plate, a fall-off preventing plate is connected to the opening in such a manner as to be rotatable in a running direction of the endless caterpillar by means of a shaft or a flexible hanging-support member, such as a double-sided adhesive tape or an adhesive, and wings are provided to both sides of the fall-off preventing plate in such a manner that the wings are always in close contact with the side wall of the opening of the hopper wall plate even when the fall-off preventing plate is rotated.

The twelfth feature of the present invention lies in that in the conveyor system with movable partitions as described above a recessed tray is placed face down under the main bars so as to permit the partitions to move within the recess.

The thirteenth feature of the present invention lies in that in the conveyor system with movable partitions as described above a portion for attachment of a proximal end of a guide-rail support leg is attached to a recessed groove formed in an outer side of each of the guide rails.

The fourteenth feature of the present invention lies in that in the conveyor system with movable partitions as described above a support for a mechanism for transmitting power to one sprocket shaft is attached to a recessed groove formed in an outer side of each of the guide rails.

BRIEF DESCRIPTION OF THE DRAWINGS

A conveyor system with movable partitions according to a preferred embodiment of the present invention will be described below in conjunction with the accompanying drawings of which:

FIG. 8 is a schematic side view illustrating another embodiment of a fall-off preventing plate of a load-receiving tray;

FIG. 10 is a schematic front view illustrating another embodiment of a movable partition to be attached to an endless caterpillar;

DETAILED DESCRIPTION OF THE PREFERRED EMBODIMENT

Figure 1:
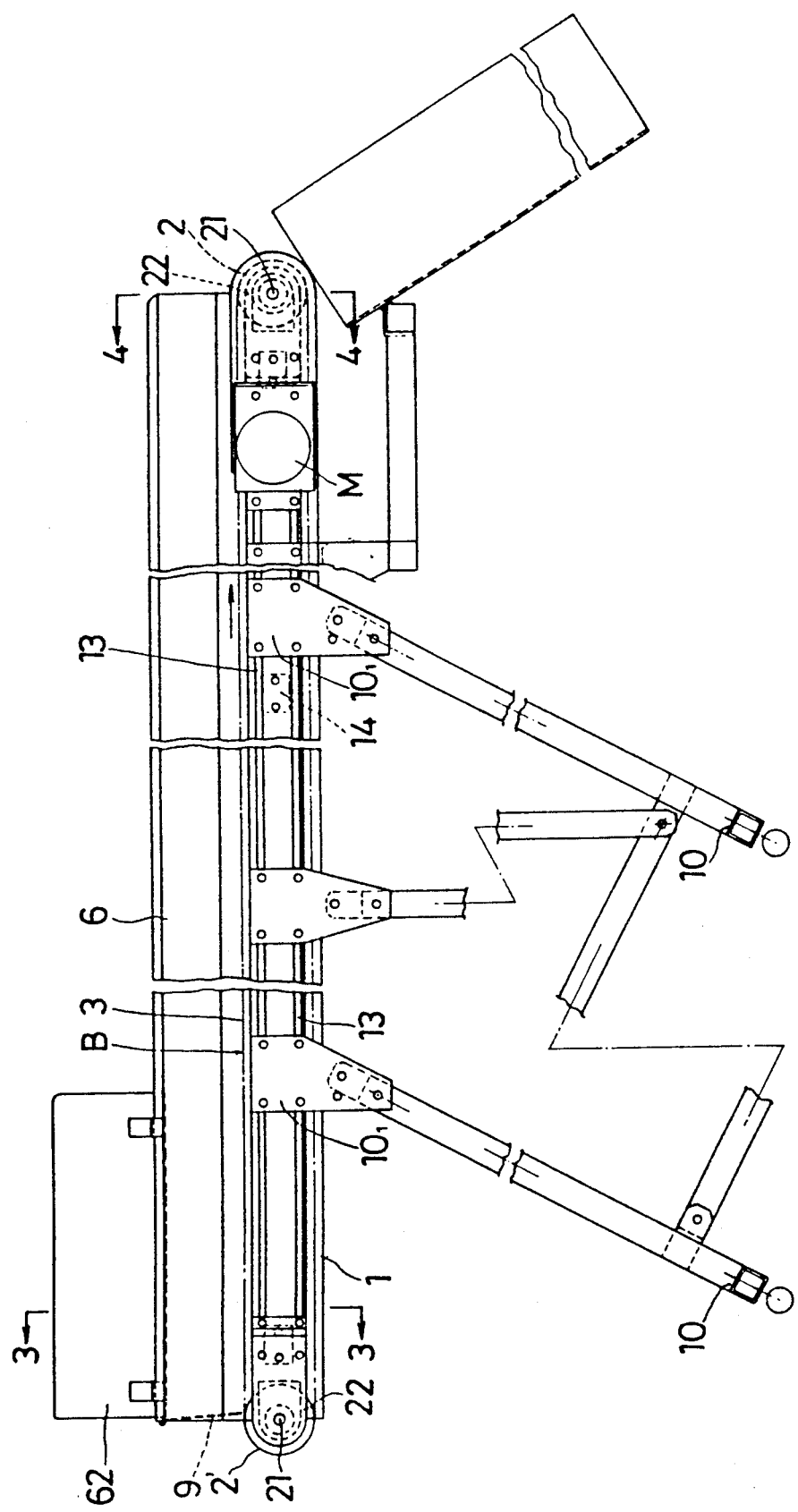
FIG. 1 is a front view.
Figure 2:
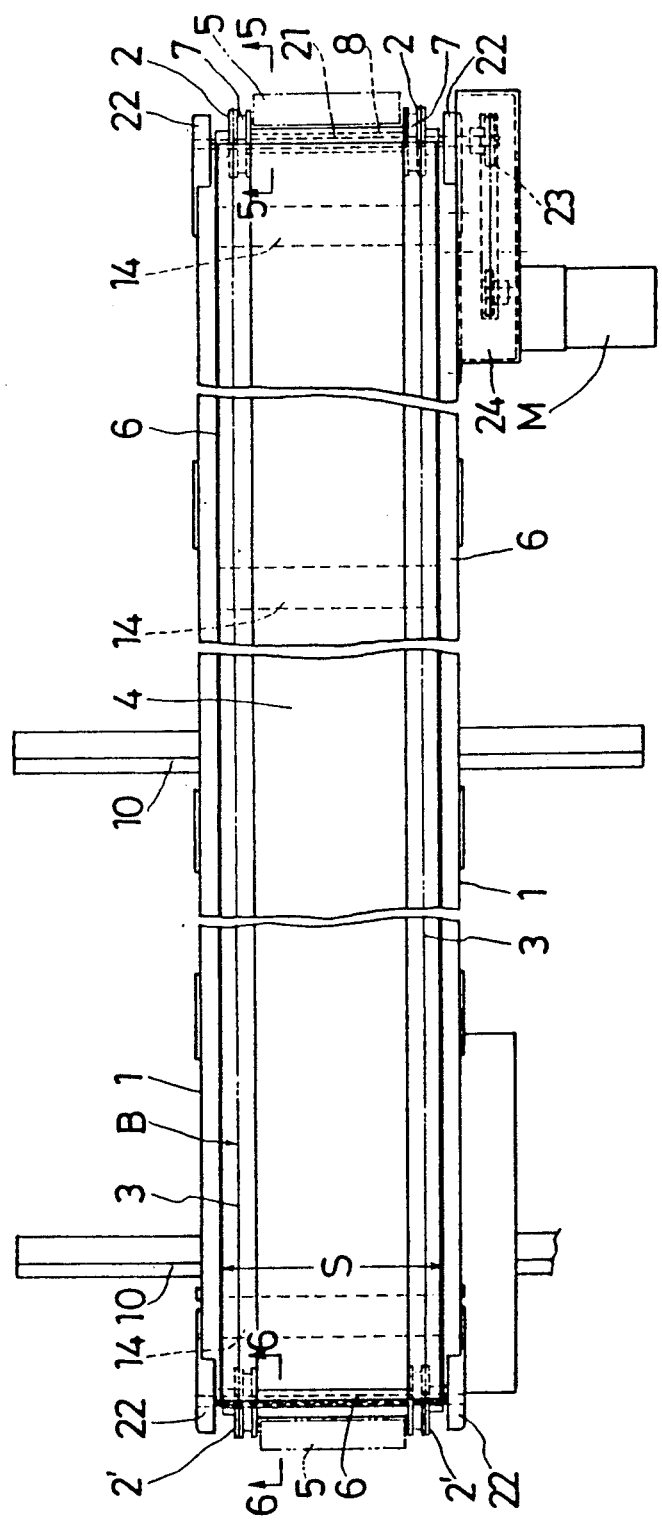
FIG. 2 is a plan view.

Referring to the accompanying drawings, reference numeral 1 denotes a pair of right and left guide rails. Each guide rail 1 has a recessed passage 11 formed in its upper portion and a support passage 12 formed in its lower portion. The upper conveying side of a chain belt is to be fitted in the recessed passage 11, and the support passage 12 receives the lower returning side of the chain belt. The guide rail 1 also has a recessed groove 13 formed in its outer side wall. The guide rails 1 are secured at a predetermined lateral width S therebetween by means of main bars 14.

Reference numerals 2 and 2' are sprockets located at the front and rear of the guide rails 1 and attached thereto by means of sprocket-shaft receiving members 22.

Reference numeral 3 denotes a chain belt which is fitted in the recessed passage 11 of the associated guide rail 1, forming a conveying side B'. After the chain belt 3 is put around the front and rear sprockets 2 and 2', with a resultant, lower returning side B" placed along the support passage 12 of the guide rail 1, and both ends of the chain belt 3 are then linked together, thereby forming an endless caterpillar B.

The chain belt 3, which may have an arbitrary shape, comprises a link 31 with a bush, made of a synthetic resin, a link plate 32 and a metal coupling shaft 30. The link plate 32 may have a protrusion 33 for receiving the chain shaft.

In this case, the chain belt 3 is fitted in the recessed passage 11 of the guide rail 1 with a gap that permits the chain belt to slide along the top and bottom sides of the link 31 with a bush and the link plate 32.

Reference numeral 4 denotes a load-receiving tray located between the right and left guide rails 1 and placed on the main bars 14. The load-receiving tray 4 has upright wing members 41 provided on respective sides with a predetermined lateral width W maintained, thus forming a recessed groove.

Each upright wing member 41 has its height, h, set to be close to the chain belt 3 on the upper conveying side B'.

A recessed tray 40 having approximately the same shape as the load-receiving tray 4 is attached face down to the bottom of the main bars 14, so that partitions 5 on the lower returning side can move in the recess of the tray 40.

The partitions 5 have a length W' matching the inner surface of the load-receiving tray 4 in the lateral width direction W, and a height h' so set as to extend over the upright wing members 41 of the load-receiving tray 4. The partitions 5 each have brackets 51 secured to the right and left ends at the over-extending position and are attached at given pitches P to the endless caterpillar B by elongated shafts 30'.

Figure 4:
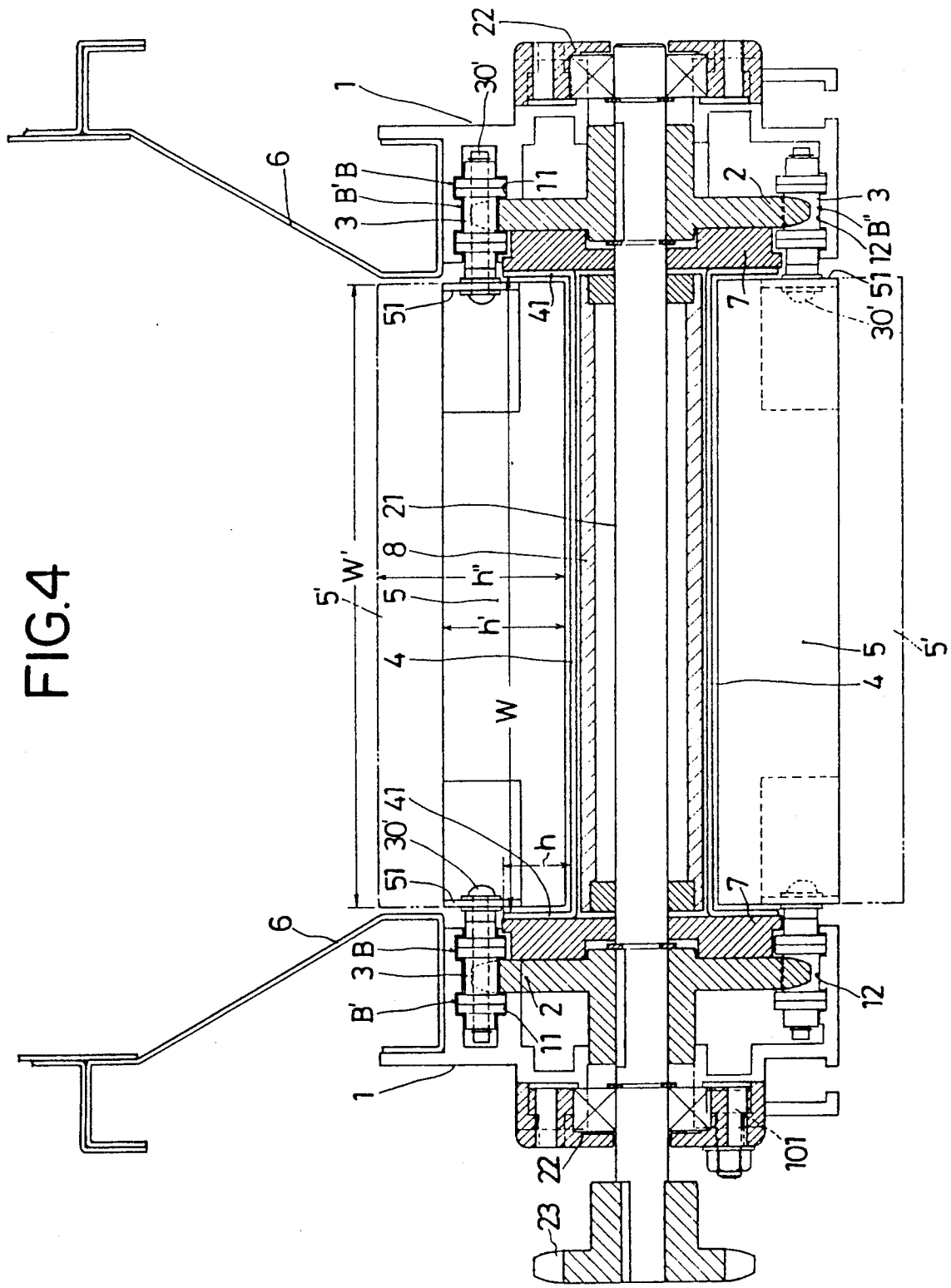
FIG. 4 is an enlarged cross section taken along the line 4—4 in FIG. 1.

The partitions 5 may be designed to have such a height h" as to come inside a side cover portion as indicated by the two-dot chain line in FIG. 4.

Figure 5:
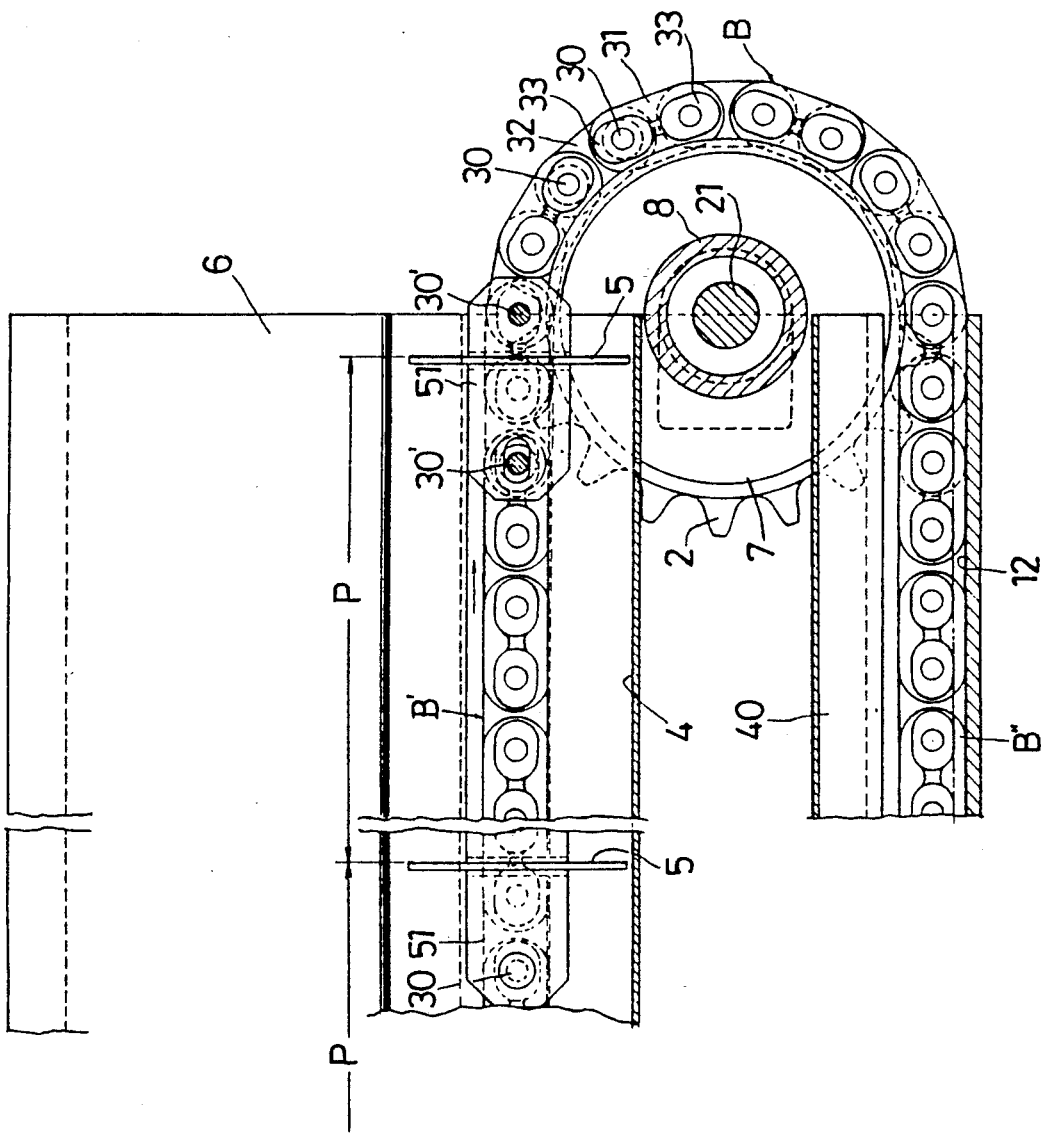
FIG. 5 is an enlarged cross section taken along the line 5—5 in FIG. 2.
Figure 6:
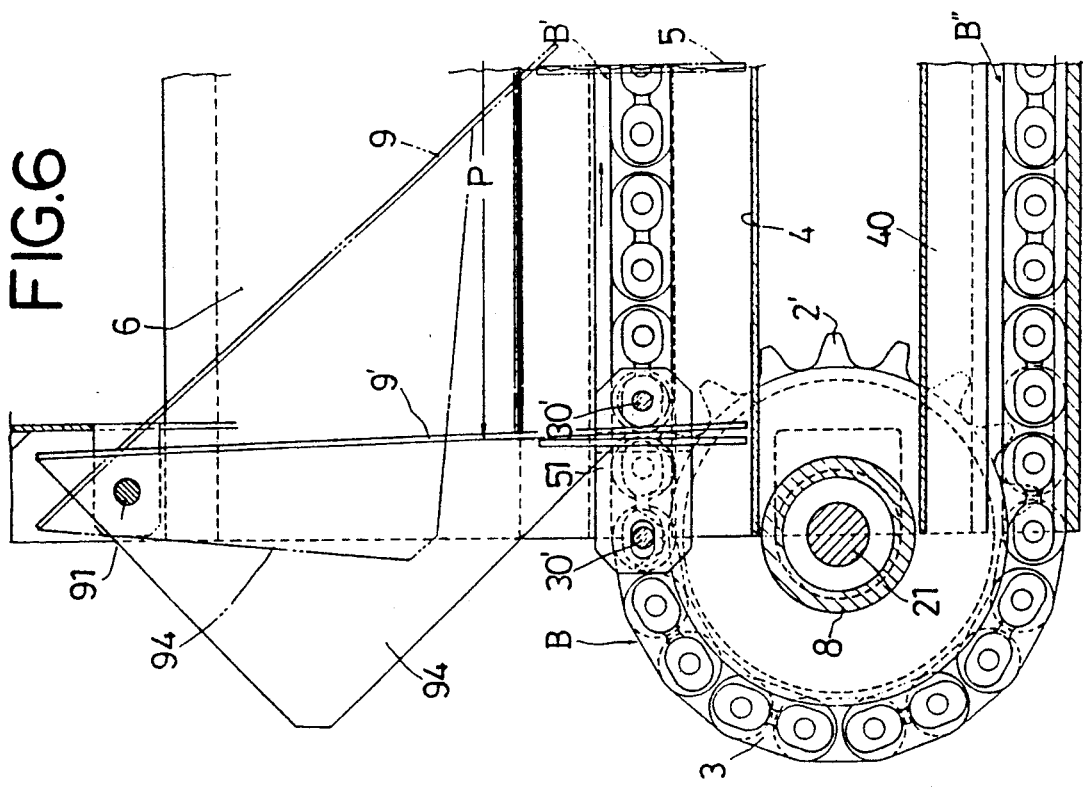
FIG. 6 is an enlarged cross section taken along the line 6—6 in FIG. 2.

Although the lower portion of each partition 5 may be tilted slightly in the running direction, it may be set perpendicular to form an angle $\theta$ of 90 degrees or a slightly obtuse angle (a slightly acute angle is desirable though) with respect to the inner bottom of the load-receiving tray 4 as shown in FIGS. 5 and 6.

Figure 12:
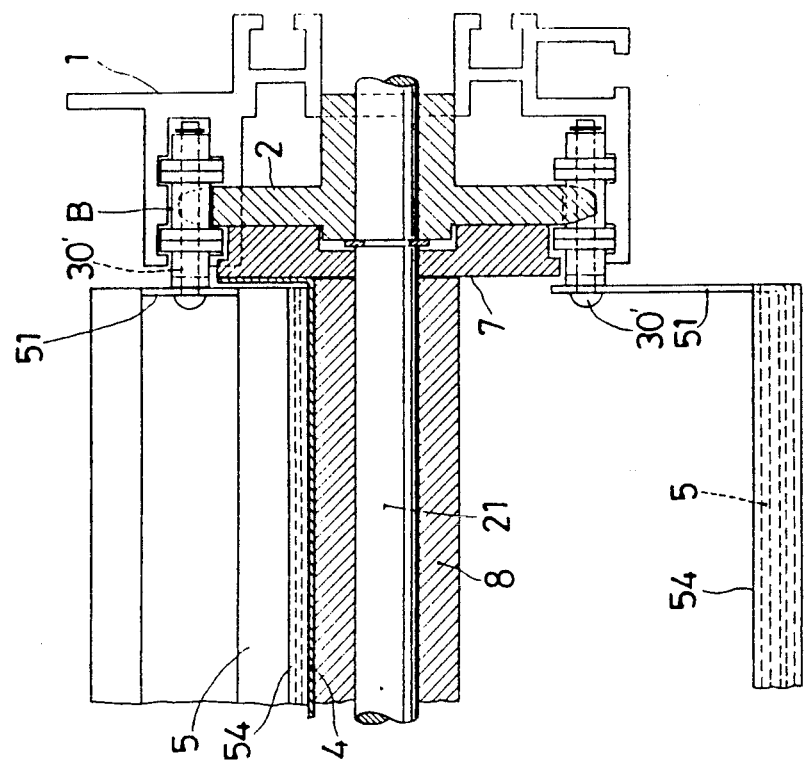
FIG. 12 is a cross section taken along the line 12—12 in FIG. 11.
Figure 9:
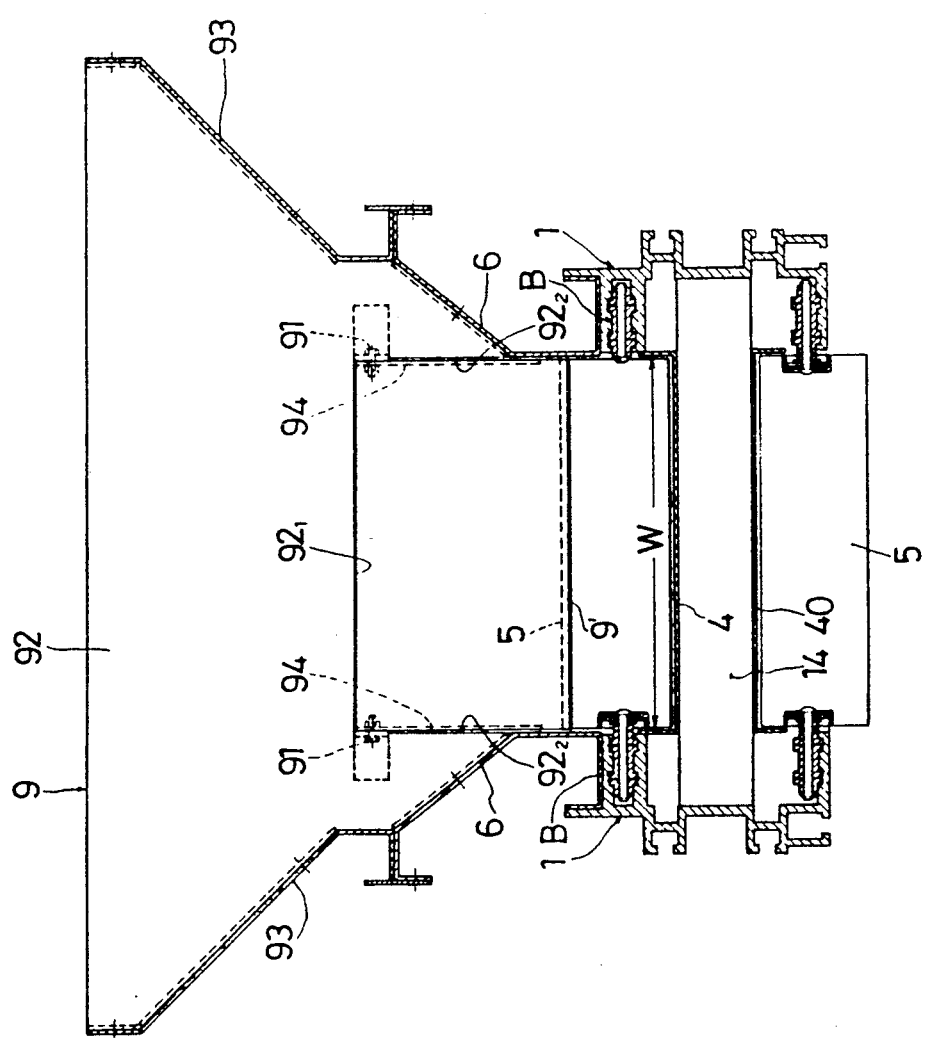
FIG. 9 is a cross section taken along the line 9—9 in FIG. 8.
Figure 11:
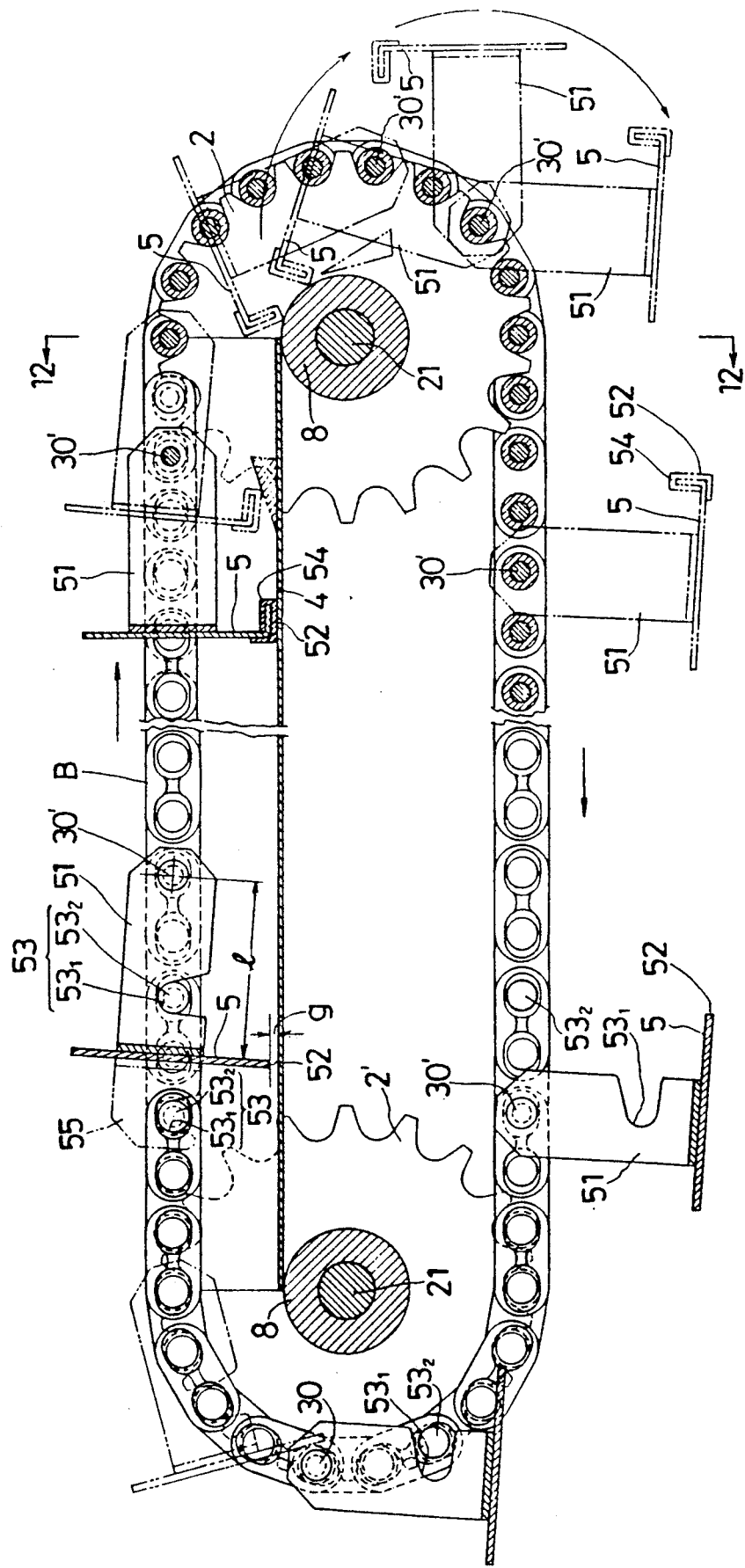
FIG. 11 is a front view specifically showing the system illustrated in FIG. 10.

Further, referring to FIGS. 10 to 12, the brackets 51 are provided on both sides of the partition 5, and the front portion of each bracket 51 in the running direction is coupled to the endless caterpillar B by the shaft 30' in such a way as to be swingable at a predetermined distance l from the associated partition 5. The partition 5 is flipped over about three quarters via the endless caterpillar B at the bracket-attached portion as the front sprocket in the running direction rotates, so that the lower edge of this partition is separated greatly from the inner bottom of the tray and is hung from the endless caterpillar in return motion.

The brackets 51 are provided with an adjusting member 53 which adjusts the gap g between the lower edge 52 of the associated partition 5 and the inner bottom of the tray 4. In the illustrated example, the adjusting member 53 has a recess $53_1$ formed in the bracket 51 and a shaft member $53_2$ provided at that position of the endless caterpillar which faces the recess $53_1$ and is fitted in the recess $53_1$.

Further, if a cone member 50 (indicated by the broken line in FIG. 10) is provided on the lower portion or upper portion of the partition 5, the tare of the partition 5 increases, thereby pressing the lower edge 52 more strongly against the inner bottom of the tray 4. Reference numeral 54 in FIG. 11 denotes a buffer member attached to the lower edge of the partition 5.

Reference numeral 6 is a side cover located directly above the upright wing member 41 of the load-receiving tray 4; the side cover 6 has its lower portion 61 securely placed on the top of the guide rail 1.

Figure 3:
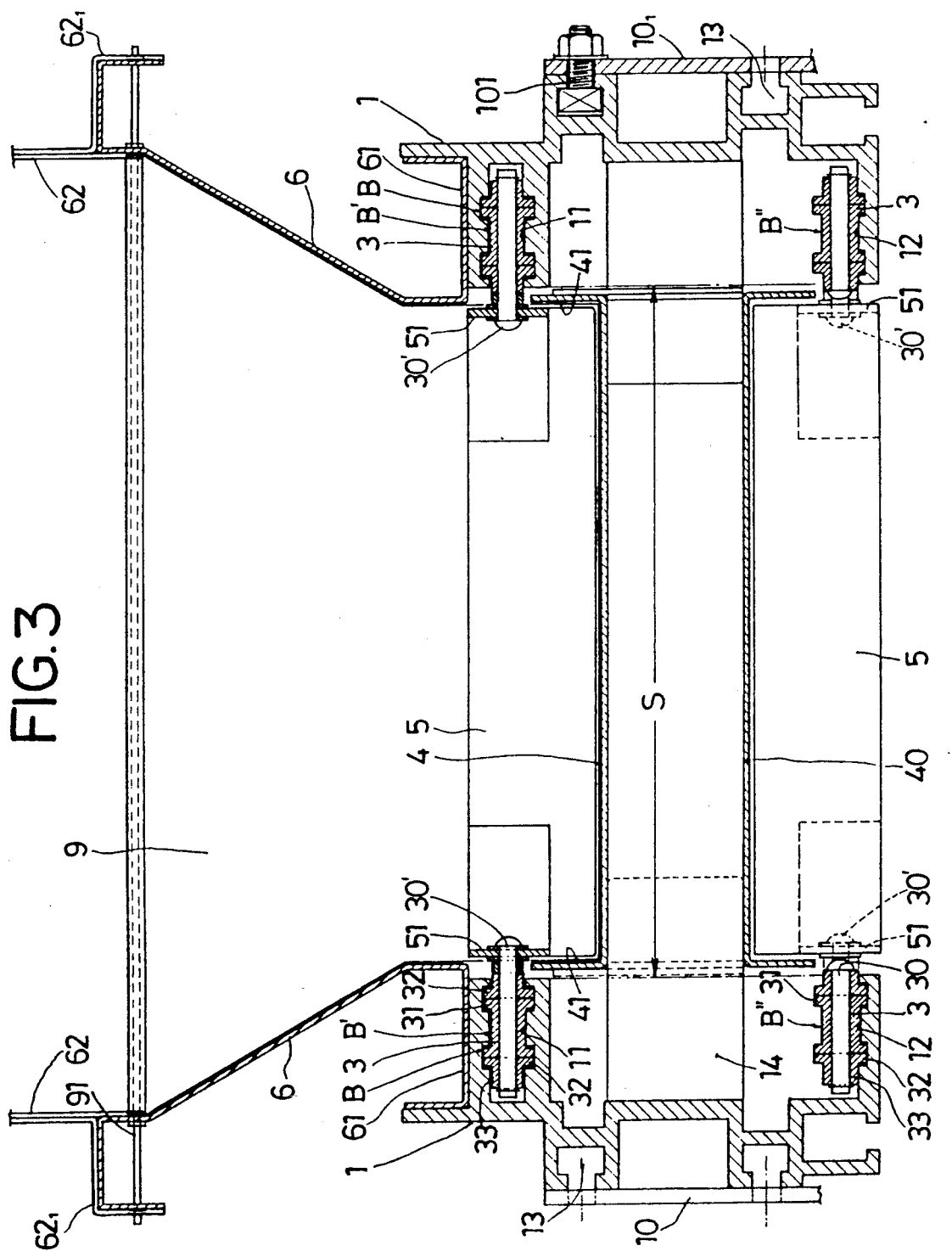
FIG. 3 is an enlarged cross section taken along the line 3—3 in FIG. 1.

Referring to FIG. 3, an auxiliary cover 62 is further attached to the rear portion of the side cover 6 by means of a engaging member $62_1$.

Reference numeral 7 denotes a gap-sealing member made of a synthetic resin, which is fitted on a shaft 21 between the front and rear sprockets 2 and $2_1$ or at least the front sprocket 2 and the load-receiving tray 4. The member 7 serves to prevent goods to be conveyed from being scattered to come inside the guide rail at the time the goods are discharged from the front end of the load-receiving tray 4 in the running direction, or prevent the goods from get caught in the chain belt 3 or the sprocket 2.

Reference numeral 8 is a contact-preventing pipe made of a synthetic resin, which is fitted on each of the front and rear rotational shafts 21 or at least one the front rotational shaft 21 between the right and left gap-sealing members 7 to inhibit goods to be conveyed from contacting the shaft 21.

Reference numeral 9 denotes a fall-off preventing plate coupled rotatably to the load-receiving tray 4 and the rear portion of the side cover 6 by a shaft 91. The plate 9 lifts the partition 5, as if to hop over it, when the partition 5 passes the plate 9 with the movement of the endless caterpillar, and the plate 9 returns to the original state after the partition 5 passes it.

Figure 7:
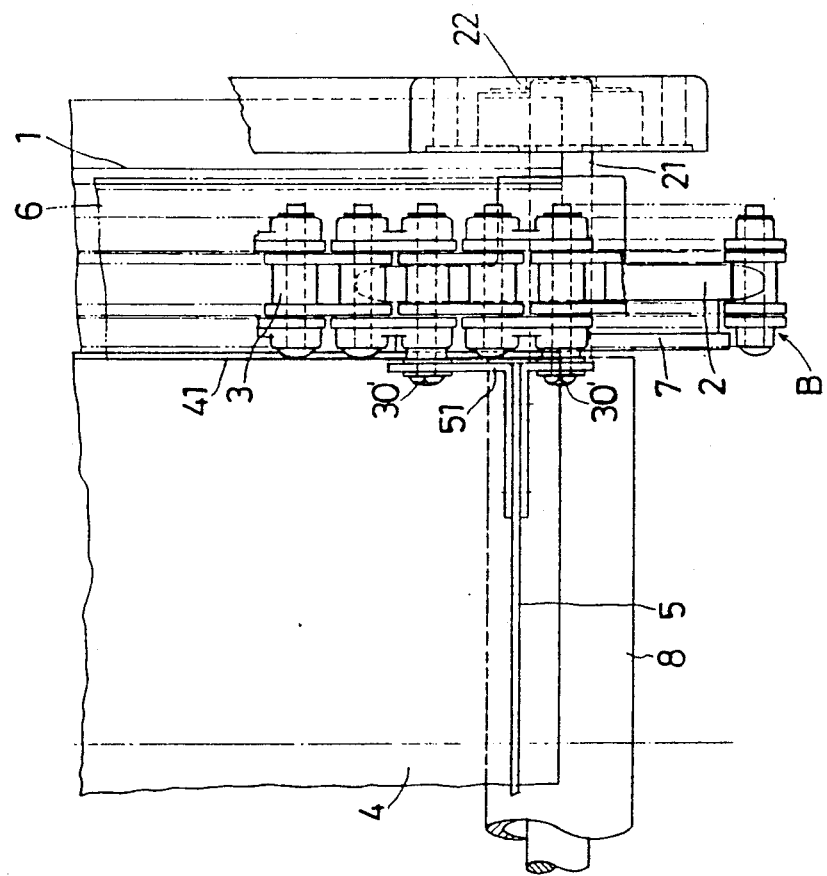
FIG. 7 is a plan view of a portion of the conveyor system shown in FIG. 5.

In FIGS. 7 and 8, a hopper wall 92 is attached to the rear end of the load-receiving tray 4, a downward opening 93 matching the inner surface of the load-receiving tray 4 in the width direction thereof is formed in the center portion of the hopper wall plate 92. The fall-off preventing plate 9' is connected to the opening 93 in such a manner as to be rotatable in the running direction of the endless caterpillar by means of the shaft 91, and wings 94 are provided on both sides of the fall-off preventing plate 9' in such a manner that the wings 94 are always in close contact with the peripheral portion of the opening of the hopper wall plate 92, even when the fall-off preventing plate 9' is rotated.

Reference numeral 10 is a support leg for the guide rail 1. The support leg 10 has a proximal-end attaching portion $10_1$ slidably attached to the recessed groove 13 formed in the outer wall of the guide rail by means of headed bolts 101.

The operation of the above-described embodiment will be explained below.

First, when the front sprocket 2 in the running direction is rotated by a drive motor M connected to the rotational shaft 21 of this sprocket 2, the chain belt 3, which is around the sprocket, moves along the associated guide rail 1. At this time, the conveying side B' of the chain belt 3 moves without turning over, or wavering or meandering by the recessed passage 11 of the guide rail 1, while the returning side of the endless caterpillar B moves without slacking due to the support passage 12 of the guide rail.

Goods to be conveyed are loaded at the rearmost portion of the space in the load-receiving tray 4 defined by the partition 5 and are stacked up to the side cover 6 as needed.

In this case, those of the stacked goods which are about to fall off the load-receiving tray 4 from the rear portion are prevented from actually falling off by the fall-off preventing plate 9 or 9'.

If the partition 5 is rotatably coupled at the front portion in the running direction by a shaft, when excessive resistance is applied to the lower edge portion of the partition 5 moving in the load-receiving tray 4, the partition 5 swings rearwardly, opposite to the advancing direction, around the coupling shaft 30 of the bracket 51 to run free of the load.

When goods to be conveyed get caught between the lower edge 52 of the partition 5 and the inner bottom of the tray 4, the partition 5 moves, thus dragging the goods along in the tray 4, and it is flipped over to set the caught goods free when the endless caterpillar B at the partition-attached portion follows up the rotation of the front sprocket 2 in the running direction.

In this state, the goods to be conveyed are raked out by the partition 5 moving together with the endless caterpillar B to discharge the goods on the load-receiving tray 4 in a container, or to the next process from the front portion in the running direction.

That portion of the goods which is to be scattered on other than a predetermined location at the time of discharging the goods, is prevented from penetrating the front sprocket portion in the running direction and inside the guide rail 1 by the gap-sealing member 7.

In addition, the contact-preventing pipe 8 inhibits goods to be conveyed from contacting the front shaft 21 in the running direction.

With the above-described structure, the conveyor system of the present invention will produce the following effects.

Guide rails for receiving chain belts are each provided between a pair of front and rear sprockets, each chain belt being around the front and rear sprockets to thereby form an endless caterpillar. The guide rails are held apart sideward from each other at a predetermined interval and are secured by means of main bars. A load-receiving tray having a recessed groove shape is provided between the right and left endless caterpillars, and multiple partitions movable in the load-receiving tray are attached approximately equidistant to the right and left endless caterpillars. Therefore, powdery or grainy goods other shapeless goods, or small loose stuff, such as molded resin articles, supplied in the load-receiving tray can be raked out by the partition so that a set amount of the goods can surely be conveyed each time by the partition.

Brackets are provided at right and left ends of each partition in such a way that front portions of the brackets, which are located apart by a predetermined distance from the associated partition in a running direction are rotatably coupled to the respective endless caterpillars by shafts, whereby the partitions are flipped over by means of the endless caterpillars where the front portions of the brackets are coupled thereto, in accordance with rotation of the front sprockets in the running direction, so that lower end portions of the partitions are greatly separated from an inner bottom of the load-receiving tray and are hung from the endless caterpillars in return motion. Therefore, the coupling shaft is located farther than the partition so that the partition can press the inner bottom of the tray by its tare and carry the goods to be conveyed in a raking-out manner.

If the goods to be conveyed get stuck o caught between the tray and the partition, the goods are conveyed in that state, and when the endless caterpillar engages at the partition-attached portion with the front sprocket and makes about a quarter of the rotation, the partition is automatically flipped over, freeing or dropping the caught goods.

If part of the stuff to be conveyed is stuck on the inner bottom of the tray and will not peel off, the partition swings rearward about the coupling shaft and moves over the stuck matter. The partition will not therefore be deformed or damaged by such a stuck matter.

Also an adjusting member for adjusting a gap between lower edges of the partitions and an inner bottom of the load-receiving tray is provided on the brackets. If the partitions and the tray are made of metal, it is possible to prevent metallic sounds or minute power from being generated by the friction or rubbing between the partitions and the tray.

A cone member is also provided at a lower portion or an upper portion of each of the partitions, so that the tare of the partition increases to provide surer urging force on the inner bottom of the tray.

That portion of each of the guide rails which is located on an upper conveying side of the associate endless caterpillar has a recessed passage formed therein for supporting top and bottom surfaces of the associated chain belt. It is therefore possible to surely avoid an undesired event, such as turnover, wavering, lifting or meandering of the chain belt in motion.

A gap-sealing member is provided to seal a gap between at least the front sprocket and the load-receiving tray, making it possible to surely prevent goods to be conveyed from being scattered and to come inside the guide rail at the time the goods are discharged from the front end portion of the load-receiving tray in the running direction.

In other words, the gap-sealing member prevents the goods to be conveyed from being scattered and entering the guide rail to be caught between the chain belt and sprockets, which otherwise causes a malfunction of the conveyor system or lowers the yield due to the reduction in the quantity or volume of the goods to be conveyed.

A recessed groove is formed in an outer side of each of the guide rails and a sprocket-shaft receiving member is attached in the recessed groove. Even if the guide rail is a molded article, therefore, the sprocket-shaft receiving member can be provided easily and surely.

A pipe for preventing goods to be conveyed from contacting sprocket shafts is supported by front sprocket shafts between at least the front right and left sprockets. It is therefore possible to surely prevent goods to be conveyed from being scattered and contacting the rotational shaft of the sprocket. In other words, the contact-preventing pipe will prevent goods to be conveyed, particularly if the goods are precision parts, from directly contacting the rotational shaft and getting stained by oil or dust, which otherwise loose or reduce the value of the products.

A side cover is provided at an upper portion of an upright wing member of the load-receiving tray. This feature permits the partition to rise above the upright wing member of the load-receiving tray and can increase the amount of goods to be conveyed accordingly. Further, the goods to be conveyed can surely be prevented from falling off the load-receiving tray by the upright wing members provided on both right and left sides of the tray.

A fall-off preventing plate is provided on the end face of a side cover on the rear sprocket side in such a manner as to be rotatable in one direction. It is therefore possible to prevent goods to be conveyed stacked up on the load-receiving tray from falling off the tray from its end portion. Further, in the case of multi-level conveyance, if the guide rail is tilted with the front side up in the running direction, goods to be conveyed can surely be prevented from falling off the load-receiving tray from the rear end portion. It is to be noted that the fall-off preventing plate swings inwardly from the rear end portion of the load-receiving tray, but its outwardly rocking motion is restricted. Therefore, the partition lifts up the fall-off preventing plate inwardly or rather causes it to hop inwardly when the partition passes the fall-off preventing plate at the time the endless caterpillar changes the returning side to the conveying side. The fall-off preventing plate will return to the original state after the partition passes it, thus permitting the partition to move without problems.

A hopper wall plate is attached to a rear end portion of the load-receiving tray, and a downward opening matching an inner surface of the load-receiving tray in a width direction thereof is formed in a center portion of the hopper wall plate. A fall-off preventing plate is connected to the opening in such a manner as to be rotatable in a running direction of the endless caterpillar by means of a shaft, and wings are provided on both sides of the fall-off preventing plate in such a manner that the wings are always in close contact with the side wall of the opening of the hopper wall plate, even when the fall-off preventing plate is rotated. If products are loaded full up to the height of the side cover, therefore, they will not come off from the rear end portion of the load-receiving tray, and the fall-off preventing plate, which is designed to have the minimum area necessary to pass the partition, simply hops around the shaft when the partition passes the hopper wall plate. Accordingly, just a small load is applied to the partition, thereby surely preventing the goods from falling off at the time the fall-off preventing plate hops.

A recessed tray is placed face down under the main bars so as to permit the partitions to move within the recess. This feature can surely prevent products being conveyed from falling off the load-receiving tray or being scattered and getting caught in the chain or sprockets at the time the products are discharged from the tray.

A portion for attachment of a proximal end of a guide-rail support leg is attached to a recessed groove formed in an outer side of each of the guide rails. Therefore, the support leg can be attached wherever desirable along the recessed groove using the guide rail. This conveyor system is thus also suitable if the conveyor is tilted upward in the running direction to convey goods in an upward oblique direction.

A support for a mechanism for transmitting power to one sprocket shaft is attached to a recessed groove formed in an outer side of each of the guide rails. It is therefore possible to attach the power transmitting mechanism including a motor together with the sprocket-shaft receiving member and the guide-rail support leg to the guide rail. Furthermore, the conveyor system is made compact so that the system is easy to store or manage when it is to be transported or is not in use.

What is claimed is:

1. A conveyor system with movable partitions comprising:
    guide rails for receiving chain belts, each guide rail being provided between a pair of front and rear sprockets, each chain belt being located around said front and rear sprockets to thereby form an endless caterpillar;
    main bars for securely holding the guide rails apart sideward from each other at a predetermined interval;
    a load-receiving tray having a recessed groove shape, provided between right and left endless caterpillars;
    multiple partitions movable in said load-receiving tray and attached approximately equidistant to said right and left endless caterpillars; and
    brackets being provided at right and left ends of each partition, so that front portions of said brackets which are located apart by a predetermined distance from an associated partition in a running direction, are rotatably coupled to said respective endless caterpillars by shafts, whereby said partitions are flipped over by means of said endless caterpillars where said front portions of said bracket are coupled thereto, in accordance with rotation of said front sprockets in said running direction, so that lower end portions of said partitions are greatly separated from an inner bottom of said load-receiving tray and are hung from said endless caterpillars during a return motion, said endless caterpillars in return motion.

2. A conveyor system according to claim 1, wherein an adjusting member for adjusting a gap between lower edges of said partitions and an inner bottom of said load-receiving tray is provided on said brackets.

3. A conveyor system according to claim 1, wherein a cone member is provided at a lower portion or an upper portion of each of said partitions.

4. A conveyor system according to claim 1, wherein that portion of each of said guide rails which is located on an upper conveying side of said associated endless caterpillar has a recessed passage formed therein for supporting top and bottom surfaces of said associated chain belt.

5. A conveyor system according to claim 1, wherein a gap-sealing member is provided to seal a gap between at least said front sprocket and said load-receiving tray.

6. A conveyor system according to claim 1, wherein a recessed groove is formed in an outer side of each of said guide rails and a sprocket-shaft receiving member is attached in said recessed groove.

7. A conveyor system according to claim 1, wherein a pipe for preventing goods to be conveyed from contacting sprocket shafts is supported by front sprocket shafts between at least front right and left sprockets of said pair of front sprockets.

8. A conveyor system according to claim 1, wherein a side cover is provided at an upper portion of an upright wing member of said load-receiving tray.

9. A conveyor system according to claim 1, wherein a fall-off preventing plate is provided on said load-receiving tray and a rear portion of a side cover in such a manner as to be rotatable in a running direction of said endless caterpillar.

10. A conveyor system according to claim 1, wherein a hopper wall plate is attached to a rear end portion of said load-receiving tray, a downward opening matching an inner surface of said load-receiving tray in a width direction thereof is formed in a center portion of said hopper wall plate, a fall-off preventing plate is connected to said opening in such a manner as to be rotatable in a running direction of said endless caterpillar by means of a shaft or a flexible hanging-support member, such as a double-sided adhesive tape or an adhesive, and wings are provided to both sides of said fall-off preventing plate in such a manner that said wings are always in close contact with said side wall of said opening of said hopper wall plate even when said fall-off preventing plate is rotated.

11. A conveyor system according to claim 1, wherein a recessed tray is placed face down under said main bars so as to permit said partitions to move within said recess.

12. A conveyor system according to claim 1, wherein a portion for attachment of a proximal end of a guide-rail support leg is attached to a recessed groove formed in an outer side of each of said guide rails.

13. A conveyor system according to claim 1, wherein a support for a mechanism for transmitting power to one sprocket shaft is attached to a recessed groove formed in an outer side of each of said guide rails.

14. A conveyor system with movable partitions comprising:
    guide rails for receiving chain belts, each guide rail being provided between a pair of front and rear sprockets, each chain belt being located around said front and rear sprockets to thereby form an endless caterpillar;
    main bars for securely holding the guide rails apart sideward from each other at a predetermined interval;
    a load-receiving tray having a recessed groove shape, provided between right and left endless caterpillars;
    multiple partitions movable in said load-receiving tray and attached approximately equidistant to said right and left endless caterpillars; and
    a pipe for preventing goods to be conveyed from contacting sprocket shafts being supported by front sprocket shafts between at least front right and left sprockets of said pair of front sprockets.

15. A conveyor system with movable partitions comprising:
- guide rails for receiving chain belts, each guide rail being provided between a pair of front and rear sprockets, each chain belt being located around said front and rear sprockets to thereby form an endless caterpillar;
- main bars for securely holding the guide rails apart sideward from each other at a predetermined interval;
- a load-receiving tray having a recessed groove shape, provided between right and left endless caterpillars;
- multiple partitions movable in said load-receiving tray and attached approximately equidistant to said right and left endless caterpillars; and
- a fall-off preventing plate being provided on said load-receiving tray and a rear portion of a side cover in such a manner as to be rotatable in a running direction of said endless caterpillar.

* * * * *

UNITED STATES PATENT AND TRADEMARK OFFICE
CERTIFICATE OF CORRECTION

PATENT NO. : 5,131,524
DATED : July 21, 1992
INVENTOR(S) : Akira UEHARA

It is certified that error appears in the above-indentified patent and that said Letters Patent is hereby corrected as shown below:

At column 2, line 28 of the printed patent, change "supports" to ---separated---.

At column 2, line 39 of the printed patent, insert ---,--- after "above".

At column 2, line 43 of the printed patent, change "above the that" to ---above, that---.

At column 2, line 50 of the printed patent, insert ---,--- after "above".

At column 2, line 55 of the printed patent, insert ---,--- after "above".

At column 2, line 61 of the printed patent, insert---,--- after "above".

At column 2, line 68 of the printed patent, insert ---,--- after "above".

At column 3, line 11 of the printed patent, insert---,--- after "above".

At column 3, line 27 of the printed patent, insert ---,--- after "above".

At column 3, line 32 of the printed patent, insert ---,--- after "above".

At column 3, line 38 of the printed patent, insert ---,--- after "above".

At column 7, line 25 of the printed patent, change "o" to ---or---.

At column 9, line 48 (claim 1, line 25) of the printed patent, change "bracket" to ---brackets---.

UNITED STATES PATENT AND TRADEMARK OFFICE
CERTIFICATE OF CORRECTION

PATENT NO. : 5,131,524
DATED : July 21, 1992
INVENTOR(S) : Akira Uehara

It is certified that error appears in the above-indentified patent and that said Letters Patent is hereby corrected as shown below:

At column 9, lines 53-54 (claim 1, lines 30-31) of the printed patent, delete ". said endless caterpillare in return motion".

Signed and Sealed this

Twelfth Day of April, 1994

Attest:

BRUCE LEHMAN

Attesting Officer

Commissioner of Patents and Trademarks